(12) United States Patent
Kwatra et al.

(10) Patent No.: US 7,103,692 B2
(45) Date of Patent: Sep. 5, 2006

(54) METHOD AND APPARATUS FOR AN I/O CONTROLLER TO ALERT AN EXTERNAL SYSTEM MANAGEMENT CONTROLLER

(75) Inventors: Atul Kwatra, Chandler, AZ (US); John P. Lee, Tempe, AZ (US); Aniruddha P. Joshi, Chandler, AZ (US); Thomas M. Slaight, Beaverton, OR (US); Peter R. Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 10/295,543

(22) Filed: Nov. 14, 2002

(65) Prior Publication Data

US 2004/0098527 A1  May 20, 2004

(51) Int. Cl.
*G06F 13/00* (2006.01)
*G06F 3/00* (2006.01)
(52) U.S. Cl. .......................................... 710/260; 710/8
(58) Field of Classification Search ............... 710/107, 710/305, 260–269, 8, 11, 12, 14
See application file for complete search history.

(56) References Cited

U.S. PATENT DOCUMENTS 5,327,121 A * 7/1994 Antles, II .............. 340/825.51
5,764,714 A * 6/1998 Stansell et al. ............. 375/377
6,070,253 A * 5/2000 Tavallaei et al. .............. 714/31
6,321,289 B1 * 11/2001 Engfer et al. ............... 710/260
6,463,492 B1 * 10/2002 Engfer et al. ............... 710/260

OTHER PUBLICATIONS

System Management Bus (SMBus) Specification, Version 2.0, Aug. 3, 2000, pp. 1, 9, 55, 56.*

* cited by examiner

*Primary Examiner*—Rehana Perveen
*Assistant Examiner*—Trisha Vu
(74) *Attorney, Agent, or Firm*—Sharon Wong

(57) ABSTRACT

Embodiments of the present invention provide a method and apparatus to allow an I/O controller to alert an external controller using an enhanced SMBus implementation that enables bi-directional capability on SMBALERT#. I/O controller includes an auxiliary control register and alert output enable (AOEN) register. When host sets AOE bit in auxiliary control register, SMBALERT# signal is configured as an output signal with bi-directional functionality. External controller uses an interface command to write to AOEN register and determine events/conditions it wants to be alerted on. SMBALERT# is activated in response to a detected event/condition. In response to SMBALERT#, external controller determines the alert generation condition using byte read commands on the system management bus, and clears SMBALERT#.

34 Claims, 4 Drawing Sheets

| BIT | DESCRIPTION |
|---|---|
| 7 | Reserved |
| 6 | AuxPWROK_EN: Enable bit for the AuxPWROK input pin. |
| 5 | VRMPWRGD_EN: Enable bit for the VRMPWRGD input pin. |
| 4 | SUS_STAT#_EN: Enable bit for the SUS_STAT# output pin. |
| 3 | USB_OC_EN: Enable bit for any of the USB Overcurrent Status bits. |
| 2 | SLP_S5#_EN: Enable bit for SLP_S5#. |
| 1 | SLP_S4#_EN: Enable bit for SLP_S4#. |
| 0 | SLP_S3#_EN: Enable bit for SLP_S3#. |

METHOD AND APPARATUS FOR AN I/O CONTROLLER TO ALERT AN EXTERNAL SYSTEM MANAGEMENT CONTROLLER

BACKGROUND

A typical computer system consists of several basic components, including a central processor, volatile and non-volatile memory, and various peripheral devices, including graphics controller(s), mass storage devices, and I/O devices. An I/O controller typically includes a PCI interface for expansion cards as well as a plurality of interfaces to I/O devices. An I/O controller may include various external bus interfaces, such as, for example, a PCI bus interface, or a system management bus (SMBus) (see "System Management Bus Specification," version 2.0, hereinafter "SMBus specification").

External system management controllers typically interface with the I/O controller using the SMBus. As defined by the SMBus specification, SMBALERT# is an input-only signal to the I/O controller. In particular, SMBALERT# is an optional signal that is an interrupt line for devices that trade their ability to master for a pin. SMBALERT# is a wired-AND signal and used in conjunction with the SMBus general call address. Messages invoked with the SMBus are two bytes long. A slave-only device, such as an external system management controller, can signal the host through SMBALERT# that it wants to talk. The host processes the interrupt and simultaneously accesses all SMBALERT# devices through the alert response address.

Since SMBALERT# is a unidirectional signal, conventional I/O controllers cannot alert an external system management controller through the SMBus nor control the SMBALERT# output from the system management controller. Additionally, external system management controllers that capture and re-drive SMBALERT# require two separate pins on the system management controller IC. Status bits must be polled at regular intervals. If an event happens after the management controller polling cycle, it does not get detected until the next polling cycle.

DETAILED DESCRIPTION

Figure 1:
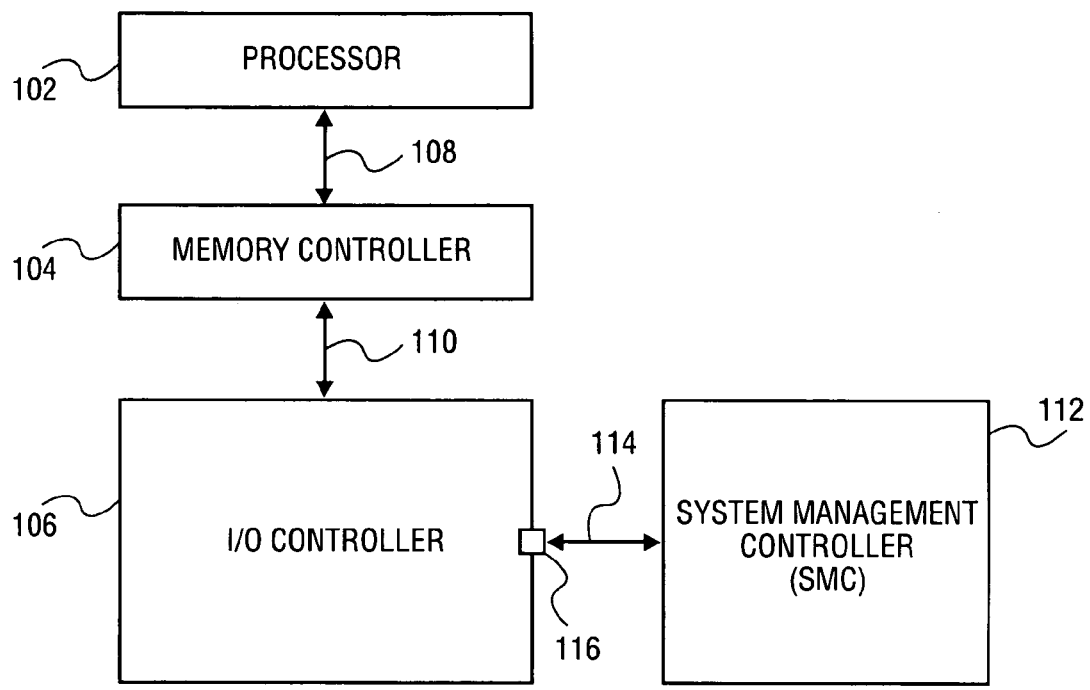
FIG. 1 illustrates a block diagram of an embodiment of an exemplary computer system embodying the present invention.

Embodiments of the present invention provide a method and apparatus to allow an I/O controller to alert an external controller using an enhanced SMBus implementation that enables bi-directional capability on SMBALERT#. I/O controller includes an auxiliary control register and alert output enable (AOEN) register. When host sets AOE bit in auxiliary control register, SMBALERT# signal is configured as an output signal with bi-directional functionality. External controller uses an interface command to write to AOEN register and determine events/conditions it wants to be alerted on. SMBALERT# is activated in response to a detected event/condition. In response to SMBALERT#, external controller determines the alert generation condition using byte read commands on the system management bus, and clears SMBALERT#.

In the detailed description, numerous specific details are set forth in order to provide a thorough understanding of the present invention. One skilled in the relevant art will recognize, however, that the invention can be practiced without one or more of the specific details, or with other methods, components, etc. In other instances, well-known structures or requests are not shown or described in detail to avoid obscuring aspects of various embodiments of the invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

FIG. 1 illustrates a functional block diagram of an embodiment 100 of an exemplary computer system embodying the present invention. The computer system may include processor 102, memory controller 104 and I/O controller 106. Processor 102 may be coupled to memory controller 104 via bus 108. Memory controller 104 and I/O controller 106 may be coupled via bus 110. I/O controller 106 includes SMBus interface 116 and receives commands from external system management controller 112 over SMBus 114. In particular, the commands are received on the SMBus interface 116.

For example, the SMBus is accessed by the operating system. Typical devices coupled to the SMBus include a smart battery, smart charger, contrast backlight control, and temperature sensors (not shown). I/O controller 106 may be any device that connects devices to an internal computer system bus, such as, for example, a PCI bus. I/O controller 106 may be, for example, a chip connecting an external system management bus to an internal PCI bus. I/O controller 106 may contain several internal buses and components, including, for example, an SMBus slave module, peripheral device interfaces, PCI bridges, PCI configuration registers, and a SMBus Host Controller.

Figure 2:
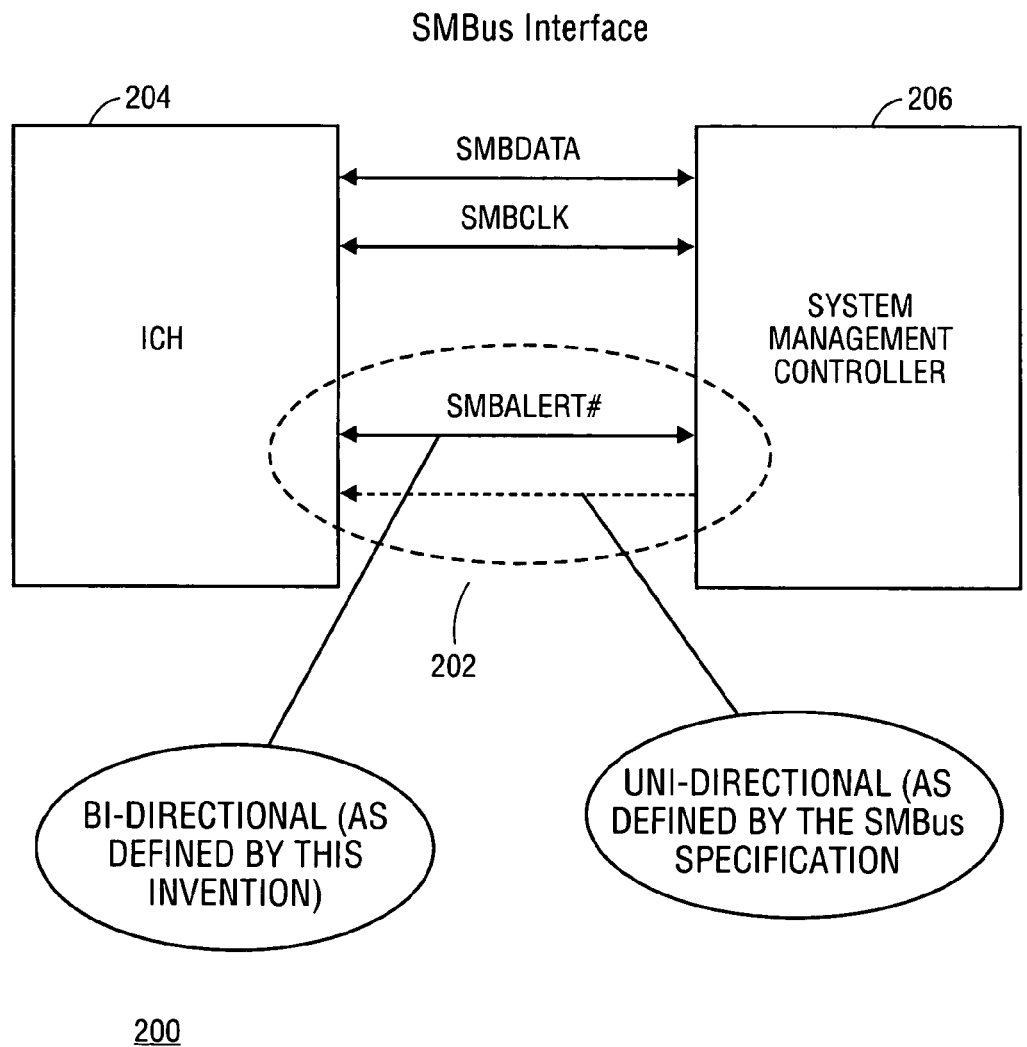
FIG. 2 illustrates a block diagram of an embodiment of SMBus interface including a bi-directional SMBALERT# on SMBus.

FIG. 2 illustrates a block diagram of an embodiment 200 of SMBus interface including a bi-directional SMBALERT# on SMBus 202. I/O controller 204 alerts system management controller 206 when certain failure events happen or certain conditions become true. System management controller 206 can control what conditions/events it wants to be alerted on by configuring SMBus controller. In particular, system management controller 206 writes to alert output enable (shown in FIG. 4) to control what conditions/events it wants to be alerted on. On detecting an alert, system management controller 206 reads the status bits associated with the alert generation condition using byte read commands on SMBus 202, and clears the SMBALERT#.

Figures 3, 4:
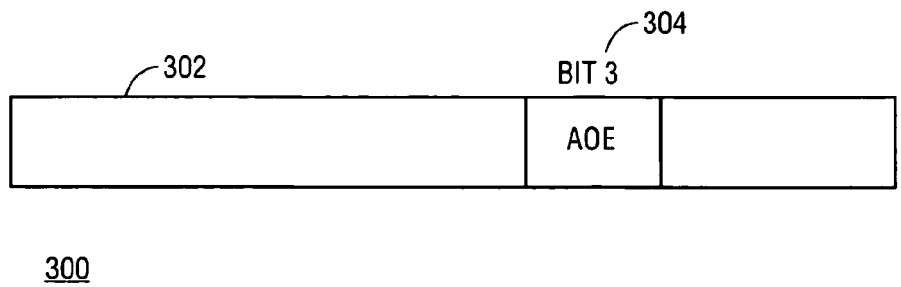
FIG. 3 illustrates a diagram of an embodiment of an auxiliary control register to enable output functionality on SMBALERT#.
FIG. 4 illustrates a diagram of an embodiment of an SMBus alert output enable register to control events that can trigger the bi-directional SMBALERT when the alert output enable signal is set.

I/O controller 204 includes an auxiliary control register and alert output enable register. FIG. 3 illustrates a diagram of an embodiment 300 of an auxiliary control register 302 to enable output functionality on SMBALERT#. In one embodiment, AOE bit is stored in register space 304 associated with bit 3 of auxiliary control register 302 and is a read/write signal. Referring to FIGS. 2 and 3, alert output enable (AOE) signal 304 in auxiliary control register 302 of I/O controller 204 enables output and bi-directional functionality on SMBALERT#. One skilled in the art will recognize that the functionality of these signals and logic gates may be embodied in different ways, or, alternatively, within firmware or software modules.

When host sets AOE bit in auxiliary control register, SMBALERT# is configured as an output signal with bi-directional functionality. The value of the signal will be determined by the AOEN register, described in FIG. 4. In one embodiment, only the host can modify AOE bit. Once AOE bit is set, the host will not have write access to the AOEN register. The AOEN register is writeable by system management controller 206 through the write alert mask slave command as described in detail below. In one embodiment, the host only writes to AOEN register to set AOE bit once. When SMBALERT# is configured as an output, its assertion does not cause an SMI or interrupt.

In a typical implementation, initially, when the system powers up, AOE bit is cleared so only the host can write to auxiliary control register 302. The host writes a specific value to auxiliary control register 302. This configures SMBALERT# to be a bi-directional signal with output capability. After the host sets AOE bit, control is transferred to SMBus slave 206 (for example, the external system management controller). SMBus slave 206 can write to AOE bit.

FIG. 4 illustrates a diagram of an embodiment 400 of AOEN register 402 to control events that can trigger the bi-directional SMBALERT when the AOE signal is set. In particular, the events that can trigger the SMB alert output are set forth in AOEN register 400. Each bit in the AOEN register 402 is associated with an event the SMBus slave can request to be alerted on. When one of the events occurs, for example, when a signal changes state from 0 to 1 or 1 to 0, an alert is sent to the SMBus slave. One skilled in the art will recognize that the corresponding events listed under "Description" are arbitrary and for exemplary purposes only. The events available for detection are not limited to the events shown in the register.

For example, referring to FIG. 4, bit 6 corresponds to an enable bit for the auxiliary power input pin. The pin gets asserted (for example, set to 1) when the external circuitry detects a change in auxiliary power level. Bit 5 corresponds to an enable bit for the voltage regulator module input pin for processor. The pin gets asserted when the circuitry in the voltage regulator module detects a change in power level.

SMBALERT# is asserted when there is a level change in any of the internal/external signals set forth in AOEN register 400. SMBALERT# will stay asserted until there is a write to AOEN register 400. Any events that happen while SMBALERT# is asserted will not cause additional activations of SMBALERT#. In response to SMBALERT#, SMBus slave reads the appropriate status bits to detect which signal(s) transitioned. SMBALERT# is used to identify when to poll the status bits. AOEN register 402 can be read from the host or the SMBus slave (for example, the external system management controller). When the AOE bit is set, AOEN register 402 can be written through SMBus slave but not the host.

For example, in a typical implementation, SMBus slave could request to be notified if a battery has been inserted, a docking event has taken place, battery is almost exhausted, function key is depressed, or an event has occurred which requires power down or up components in the computer system (e.g., to cause the external controller to switch a device off from an IDE power plane via switch). In other embodiments, SMBus slave could configure the SMBus controller such that it is alerted when a thermal analog-to-digital device indicates when temperature in the system or at a particular component exceeds a predetermined threshold. SMBus slave could also be alerted when an IDE power plane switch controls power management (i.e., disconnecting and reconnecting devices to the power plane).

Once alerted, SMBus slave determines what event triggered the event and notifies the operating system environment (i.e., the execution of operating system code) or the system management environment (i.e., the execution of system management code) that an event has occurred. Thus, instead of SMBus slave continuously polling, the SMBALERT# is configured as an output signal to alert the external controller. This saves bandwidth in that SMBus slave does not have to continuously poll. Detection is also speeded up in that the external controller does not have to wait until the next polling cycle to detect an event if the event happens in between polling cycles. In a typical implementation, once an event is detected, the SMBus alert output signal goes to 0. Once that happens, SMBus slave knows that an event occurred. Once alerted by SMBALERT#, SMBus slave reads the appropriate register to determine what happened.

SMBus slave uses an interface command to write to AOEN register 400 and determine events/conditions it wants to be alerted on. In particular, SMBus slave performs a write alert output enable register command to the I/O controller system management bus slave (as a byte write). SMBus slave uses a command on the SMBus to write to AOEN register 400. The first data byte is interpreted as the command, and the second data byte (AOEN register field (bits 20–27)) indicates the value that should be written to the AOEN register 400. TABLE 1 shows one exemplary embodiment of a write AOEN register command format.

TABLE 1

WRITE ALERT OUT PUT ENABLE REGISTER COMMAND FORMAT

| Bit | Description | Driven By | Comment |
| --- | --- | --- | --- |
| 1 | Start Condition | External Controller | |
| 2–8 | Slave Address-7 bits | External Controller | Must match value in Receive Slave Address register |
| 9 | Write | External controller | Always 0 |
| 10 | ACK | I/O Controller | |
| 11–18 | Command (8-bits) | External Controller | This field indicates which command will be executed |
| 19 | ACK | I/O Controller | |
| 20–27 | AOEN Register value | External Controller | AOEN register values |
| 28 | ACK | I/O Controller | |
| 29 | Stop | External Controller | |

In a typical implementation, the write alert output enable register command is a byte write command supported by the SMBus protocol. In particular, a byte write is executed with particular command code and the desired value is written into the into the AOE register. The value is a reflection of what events the external controller wants to be alerted on. For example, in an 8 bit AOE register, the external controller can write 1 on bits 4 and 6 and 0 on the rest of the bits to select being alerted on the corresponding events selected, i.e. enable bit for the SUS_STAT# output pin and enable bit for the AuxPWROK input pin. In another example, the external controller can write 1 to all of the bits to detect all of the corresponding events in the AOE register. The external controller can thus control what it wants to get alerted on.

Figure 5:
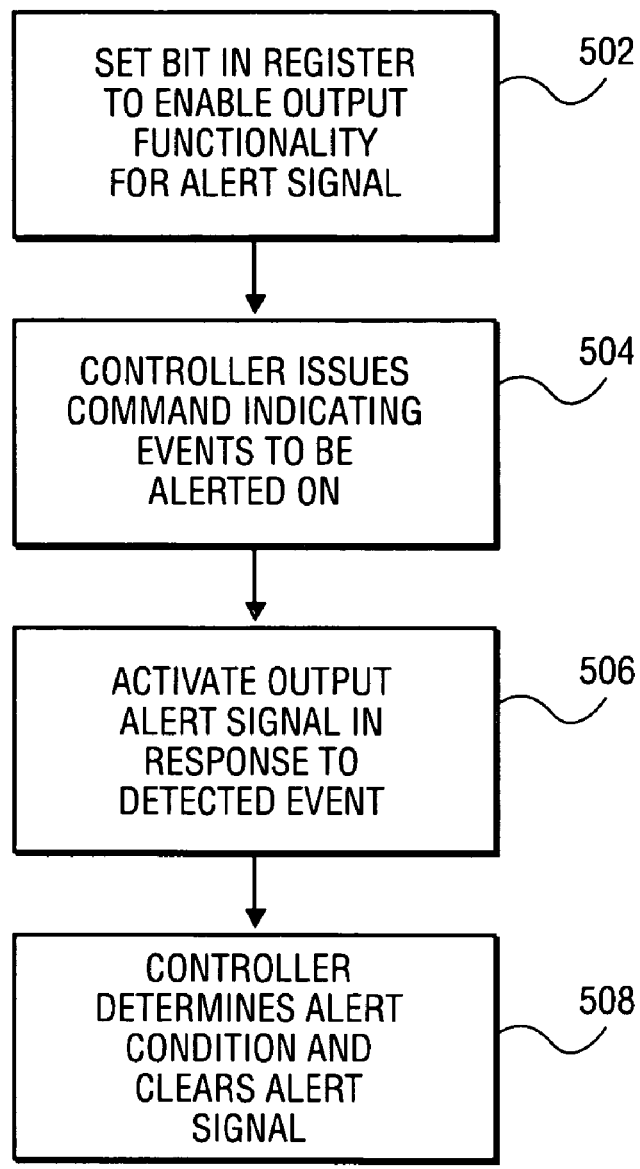
FIG. 5 is a flow diagram of an embodiment of a routine for enabling output functionality on SMBALERT#.

FIG. 5 is a flow diagram of an embodiment 500 of a routine for enabling output functionality on SMBALERT#. In step 502, the host sets AOE signal in auxiliary control register to enable output functionality for SMBALERT#. In a typical embodiment, the host via alert output enable logic determines whether alert output enable is active, and sets output enable bit in auxiliary control register of the I/O system management controller to enable output functionality on SMBALERT#. For example, alert enable bit may be set to logical '0' to indicate an inactive status and logical '1' to indicate an active status; an active status may indicate that the alert output enable register is writeable by the external system management controller through the write alert mask slave command.

If the host software does not set the AOE bit, the command is ignored. In particular, only the host can modify the alert output enable bit. Once the alert output enable bit is set, the host will not have write access to the alert output enable register, which will become writeable by an external system management controller through the write alert mask slave command. The alert output enable bit is preferably only written to once.

In step 504, a command is received from system management controller over SMBus. The command generally indicates what conditions/events the system management controller wants to be alerted on. The write alert output enable register command may be received over SMBus by I/O controller via SMBus interface. I/O controller may include logic to receive and process the "write alert output enable register" command. For example, this logic may be embodied within arbitration logic, or, alternatively, within other SMBus command processing logic within controller. The command may be, for example, an SMBus write command with a new write command code. A command signal may be activated in response to receiving the command. In an embodiment, alert logic may activate command signal. In an alternative embodiment, other SMBus command processing logic within controller may activate command signal.

In step 506, SMBALERT# is activated in response to a detected event/condition. The SMBALERT# signal identifies to the external system management controller when to poll the status bits. In particular, the SMBALERT# is asserted when there is a level change in any of the internal/external signals. The alert output enable register controls the events that can change the value of the SMBALERT#. Any events that happen while the SMBALERT# is asserted will not cause additional activations of the SMBALERT#. In response to the SMBALERT# from the I/O controller, the external system management controller reads the status bits to detect which signals transitioned.

In step 508, upon detecting an alert, the system management controller determines (for example, reads the status bits associated with) the alert generation condition using byte read commands on the system management bus, and clears SMBALERT#.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A controller, comprising:
    an interface to a system management bus;
    an output for a system management bus (SMB) alert;
        wherein the SMB alert is enabled for bidirectional capability; and
    logic, coupled to the system management bus interface and the alert output, to reconfigure an existing signal to provide output alert to the system management bus, wherein the controller provides the output alert to an external system management controller.

2. The controller claimed in claim 1, wherein the existing signal is an alert enable signal.

3. The controller claimed in claim 2, wherein the alert enable signal is a system management bus alert signal.

4. The controller claimed in claim 1, wherein the existing signal is configured in response to an alert enable bit.

5. The controller claimed in claim 4, further comprising:
    a first register to store the alert enable bit.

6. The controller claimed in claim 5, further comprising:
    a second register to store associated signals that are to be monitored.

7. The controller claimed in claim 6, wherein the configured existing signal is asserted on the system management bus when any of the associated signals reaches a predefined level and the alert output enable bit is activated.

8. The controller claimed in claim 6, wherein the configured existing signal is asserted when there is a level change in any of the signals specified in the second register and the alert enable bit is activated.

9. The controller claimed in claim 6, wherein an input command is applied on the system management bus to the second register.

10. The controller claimed in claim 9, wherein the associated signals comprise events that can trigger the alert output.

11. The controller claimed in claim 9, wherein an external device provides the input command to configure the events to be monitored.

12. The controller claimed in claim 11, wherein the external device is an external system management controller.

13. The controller claimed in claim 11, wherein the external device uses the system management bus to configure the causes of the alert output.

14. The controller claimed in claim 13, wherein the alert output comprises an SMBALERT output.

15. The controller of claim 5, wherein the logic further comprises:
    alert output enable logic to activate the alert enable bit in the status register.

16. The controller claimed in claim 4, wherein the alert output enable bit is set by a host.

17. A method to configure SMBALERT for output capability, comprising:
    enabling bi-directional capability for SMBALERT;
    receiving a command from an external system management controller for configuring the causes of the associated SMBALERT output; and
    activating SMBALERT output in response to detection of one of the causes and alerting the external system management controller.

18. The method claimed in claim 17, wherein enabling bi-directional capability for SMBALERT further comprises:
    setting an enabling bit in a first register to enable bi-directional capability for SMBALERT.

19. The method claimed in claim 18, wherein setting an enabling bit in a first register to enable bi-directional capability for SMBALERT further comprises:
    receiving a signal from a host to setting the enabling bit.

20. The method claimed in claim 19, wherein receiving a command from an external system management controller for configuring the causes of the associated SMBALERT output further comprises:
    selecting causes that could trigger SMBALERT.

21. The method claimed in claim 20, wherein the causes are stored in a second register.

22. The method claimed in claim 21, wherein activating SMBALERT output in response to detection of one of the causes further comprises:
    asserting SMBALERT on system management bus when any of the selected causes reaches a predefined level and the enabling bit is activated.

23. The method claimed in claim 21, wherein activating SMBALERT output in response to detection of one of the causes further comprises:
    asserting SMBALERT on system management bus when there is a level change in any of the selected causes and the enabling bit is activated.

24. A machine-readable medium having stored therein a plurality of machine-readable instructions executable by a processor to configure SMBALERT for output capability, comprising:
    instructions to enable bidirectional capability for SMBALERT;
    instructions to receive a command from an external system management controller for configuring events that could trigger SMBALERT output; and
    instructions to activate SMBALERT output in response to detection of one of the events and alert the external system management controller.

25. The machine-readable medium claimed in claim 24, wherein instructions to enable output capability for SMBALERT further comprises:
    instructions to set an enabling bit in a first register to output capability for SMBALERT.

26. The machine-readable medium claimed in claim 25, wherein instructions to set an enabling bit in a first register to enable output capability for SMBALERT further comprises:
    instructions to receive a signal to set the enabling bit.

27. The machine-readable medium claimed in claim 26, wherein instructions to receive a command from an external system management controller for configuring the events that could trigger SMBALERT output further comprises:
    instructions to select events that could trigger SMBALERT.

28. The machine-readable medium claimed in claim 27, wherein the events to be selected from are stored in a second register.

29. The machine-readable medium claimed in claim 28, wherein instructions to activate SMBALERT output in response to detection of one of the selected events further comprises:
    instructions to assert SMBALERT on system management bus when any of the selected events reaches a predefined level and the enabling bit is activated.

30. The machine-readable medium claimed in claim 28, wherein instructions to activate SMBALERT output in response to detection of one of the selected events further comprises:

instructions to assert SMBALERT on system management bus when there is a level change in any of the selected events and the enabling bit is activated.

31. An apparatus for configuring SMBALERT for bi-directional capability, comprising:
- a first register for receiving a signal for enabling SMBALERT for bi-directional capability;
- a second register for receiving a command from external system management controller predefining at least one event for alert; and
- a controller for activating SMBALERT in response to detection of the predefined event, wherein SMBALERT is configured for alerting the external system management controller, wherein the controller provides the SMBALERT to the external system management controller.

32. A method to configure a system management bus alert for output capability, comprising:
- enabling bi-directional capability for the system management bus alert;
- receiving a command from an external system management controller for configuring the causes of the associated system management bus alert output; and
- activating the system management bus alert output in response to detection of one of the causes and alerting the external system management controller.

33. A machine-readable medium having stored therein a plurality of machine-readable instructions executable by a processor to configure a system management bus alert for output capability, comprising:
- instructions to enable bidirectional capability for the system management bus alert;
- instructions to receive a command from an external system management controller for configuring events that could trigger the system management bus alert output; and
- instructions to activate the system management bus alert output in response to detection of one of the events and alert the external system management controller.

34. An apparatus for configuring system management bus alert for bi-directional capability, comprising:
- a first register for receiving a signal for enabling a system management bus alert for bi-directional capability;
- a second register for receiving a command from external system management controller predefining at least one event for alert; and
- a controller for activating the system management bus alert in response to detection of the predefined event, wherein the system management bus alert is configured for alerting the external system management controller, wherein the controller provides the system management bus alert to the external system management controller.

* * * * *